United States Patent Office 3,317,468
Patented May 2, 1967

3,317,468
EPOXYAMINE RESIN
James R. Griffith, Riverdale Heights, Md., assignor to the United States of America as represented by the Secretary of the Navy
No Drawing. Filed Aug. 13, 1964, Ser. No. 389,504
3 Claims. (Cl. 260—47)

The invention described herein may be manufactured and used by or for the Government of the United States of America for governmental purposes without the payment of any royalties thereon or therefor.

This invention relates to a novel curable composition which produces an improved resin plastic, and more particularly, to a resinous material for impregnating glass fibers, vitreous silica sheets, fabrics or laminates and other reinforced filamentary or fibrous material to provide products having unusual structural strength.

Hard, durable epoxide resins have been obtained from mixtures containing the reactant, meta phenylene diamine with the diglycidyl ether of bisphenol A, and the cured resins have found considerable application in composite materials, such as glass fibers bonded with resin. While the cured plastics of this reaction have outstanding bonding properties for fibrous material and for laminates of this material, serious disadvantages in these plastics are due to brittleness and the tendency to break at relatively low elongations.

Prior art efforts to improve the elongation in plastics have as a rule followed the chemical expedient of incorporating an aliphatic chain into the plastic structure. However, this method has proved unsuccessful because any improvement in the elongation of said plastic was accompanied with a drastic reduction in tensile strength and modulus.

It is an object of the present invention to provide an improved epoxyamine resin having an unusually high structural strength based on the combined effect of a higher tensile strength and greater elongation.

Another object of the invention is to provide desirable modifications in a prior art resinous composition by effecting a slight change in the chemical structure of said composition.

A further object of the invention is to provide reinforced plastic compositions which are tougher and more durable than previous reinforced structures.

Further objects and advantages of the invention will become apparent from the following detailed description.

The present curable composition comprises a mixture of diglycidyl ether of bisphenol A with meta-aminobenzylamine as the reactant. Bisphenol A is the dihydric phenol, 2,2-bis (4-hydroxyphenyl) propane. The curable composition of the invention contains relative proportions of ingredients that provide one amino hydrogen of the diamine reactant for each epoxy group of the diepoxide. Each mole of the diamine reacts with two moles of diepoxide to produce the present epoxide resin. The composition is prepared by mixing equivalent amounts of meta-aminobenzylamine with the diglycidyl ether of bisphenol A in liquid form at room temperature for a time sufficient to epoxidize all the double bonds in the diepoxide.

Meta-aminobenzylamine is a waxy solid which melts at about 40° C. and produces a liquid system when mixed with the diepoxide liquid. The mixture hardens at room temperature in about 12 hours. However, the reaction may be made to proceed more rapidly so that the mixture will harden in less time by increasing the temperature of the reacting mixture as high as 100° F. or even more. Low temperature favors the reaction because of its exothermic nature, the diamine employed herein being considerably more reactive. The solid resin is initially cured at 150° F. for about 1 hour and final curing is conducted at 250° F. for about 3 hours to obtain a gradual curing period for optimum structural strength characteristics.

The cured product of the invention attains considerably more elongation, averaging about 10.5% but extending beyond this average to maximum values of about 11.5%. The present composition passes through a maximum tensile strength of about 12,200 p.s.i. on the average where a yield point occurs; a lesser tensile strength is then required to draw the composition further when rupture then occurs at higher elongation. The improvement in elongation is substantially higher than that achieved by previous compositions (7.5%) which include the diglycidyl ether of bisphenol A.

Previous epoxy resin plastics which display increases in elongation are offset with substantial decreases in tensile strength and modulus. Consequently, the more extensible plastic as a rule becomes weaker. In the present composition it is axiomatic that improvement in elongation is achieved without substantial sacrifice in tensile strength or modulus. Further, the improved structural strength for the novel composition may be attributed to toughness, a property directly related to elongation.

Although nearly everyone has a feeling for what is meant by the word "toughness," a satisfactory scientific method of measuring it is lacking. One definition of toughness is the energy required to break a material. This energy is equal to the area under a stress-strain curve, calculated by tensile strength X elongation as lbs.-in./in.$^3$.

The ultimate energy resistance of a material is considered to be the maximum amount of work that can be done on the material per unit of volume without causing the material to rupture. Most of this work is dissipated as heat and in causing permanent deformation of the material, only a small part being stored in the material as stress energy that can be recovered when the stress is released. Toughness, therefore, is the property of a body by which work can be done on the body when stressed beyond its elastic limit or yield point. A tough material is needed to resist energy loads when the material in service is likely to be stressed beyond its yield point. The prior art resin formed with meta-phenylenediamine has a toughness value, calculated by tensile strength X elongation equal to 610 p.s.i. The meta-aminobenzylamine product has a toughness value of 1000 p.s.i., an improvement of more than 60% over the prior art.

The cured plastic composition of the invention is characterized by a high tensile strength, high modulus in addition to a large elongation and a yield point. The specimen does not elongate uniformly; it passes a distinct maximum in tensile strength at about 12,300 p.s.i. where the yield point occurs. The specimen then undergoes further elongation, the stretching proceeds with lesser tensile strength. The elongation is about 40% larger than the prior art value for the diglycidyl ether of bisphenol A which is reacted with the meta-phenylenediamine. Obviously, the present plastic absorbs considerably more energy before rupture than the bonding plastic previously employed.

The meta-aminobenzylamine reactant produces a resin system in accordance with the invention which is tough and hard and fiber-reinforced materials bonded with this resin can withstand greater compressional and tensional forces. The volume strain that these materials can undergo can be demonstrated by a glass-fiber casing or "pressure bottle" which forms the subject matter of applicant's copending applicaton, Serial No. 389,505, filed on even date herewith. The motor casing described in the copending application comprises a filament-wound structure in which the filaments are impregnated with the resin composition of the present invention. The filament-resin bond is considerably stronger as proven by further increases in bursting pressure for the filament-wound structure that contains the improved epoxyamine resin.

Meta-aminobenzylamine has an intermediate structure between the meta-phenylenediamine previously employed for epoxide systems and the aliphatic chains which add softness to resin compositions. The intermediate structure has been found to be effective for elongation but without the corresponding loss of tensile strength or material loss in modulus.

The following illustrative example serves to illustrate the practice of the invention.

A mixture containing 17.5 parts by weight meta-aminobenzylamine and 100 parts by weight of diglycidyl ether of bisphenol A was calculated to contain one amino hydrogen atom for each epoxy group. The mixture was maintained at 72° F. for 12 hours during which time the resin solidified to a transparent clear solid. The solid was heated at 150° F. for one hour and at 250° F. for 3 hours. The color of the solid became slightly amber as a result of this heating.

The tensile strength of this solid was obtained from accurately machined and polished resin samples cut in the shape of dumbbells to fit in the tensile testing machine at a crosshead speed of 0.05 inch per minute in accordance with ASTM method D638–60T. The sample at about 12,300 p.s.i. developed a constriction, the material in the constricted region undergoing considerable elongation before breaking.

While a preferred embodiment of the present invention has been described and exemplified, it is apparent that modifications may be made without departing from the invention in its broader aspects. The aim of the appended claims, therefore, is to cover all such changes and modifications as fall within the true spirit and scope of the invention.

What is claimed is:

1. A heat curable epoxy resin composition comprising a mixture of meta-aminobenzylamine and the diglycidyl ether of 2,2-bis (4-hydroxyphenyl) propane in which said amine is present in proportions to provide an amino hydrogen atom for each epoxy group of said glycidyl ether.

2. A heat curable epoxy resin composition comprising the reaction product of a meta-aminobenzylamine and the diglycidyl ether of 2,2-bis (4-hydroxyphenyl) propane in the proportions of one mole of said amine to two moles of said diglycidyl ether.

3. An epoxy resin composition comprising the reaction product of meta-aminobenzylamine and the diglycidyl ether of 2,2-bis (4-hydroxyphenyl) propane in the proportions of one mole of said amine to two moles of said diglycidyl ether which has been subjected to heat curing in the solid state at about 150° F. for about one hour and then at about 250° F. for a time sufficient to complete the cure.

References Cited by the Examiner

UNITED STATES PATENTS 2,801,229    7/1957    De Hoff et al.   ------- 260—47

FOREIGN PATENTS 909,313    10/1962    Great Britain.

WILLIAM H. SHORT, *Primary Examiner.*

T. D. KERWIN, *Assistant Examiner.*